United States Patent
Meguro et al.

(10) Patent No.: US 9,058,916 B2
(45) Date of Patent: Jun. 16, 2015

(54) COMPOSITE CONDUCTIVE POLYMER COMPOSITION, METHOD OF MANUFACTURING THE SAME, SOLUTION CONTAINING THE COMPOSITION, USE OF THE COMPOSITION

(75) Inventors: Hikaru Meguro, Sayama (JP); Shuji Okamoto, Sayama (JP); Fumiaki Kobayashi, Sayama (JP)

(73) Assignee: SOKEN CHEMICAL & ENGINEERING CO., LTD., Tokyo (JP)

( * ) Notice: Subject to any disclaimer, the term of this patent is extended or adjusted under 35 U.S.C. 154(b) by 611 days.

(21) Appl. No.: 13/148,581

(22) PCT Filed: Feb. 17, 2010

(86) PCT No.: PCT/JP2010/052353
§ 371 (c)(1),
(2), (4) Date: Aug. 9, 2011

(87) PCT Pub. No.: WO2010/095649
PCT Pub. Date: Aug. 26, 2010

(65) Prior Publication Data
US 2011/0309308 A1     Dec. 22, 2011

(30) Foreign Application Priority Data

Feb. 17, 2009   (JP) ................... 2009-033644

(51) Int. Cl.
*H01B 1/12* (2006.01)
*C08F 220/26* (2006.01)
(Continued)

(52) U.S. Cl.
CPC .............. *H01B 1/127* (2013.01); *C08F 220/26* (2013.01); *C08F 220/38* (2013.01);
(Continued)

(58) Field of Classification Search
CPC ............ C09D 5/00; C09D 5/004; C01G 1/00; Y02E 10/549; H01L 51/0043; H01L 51/0035; H01L 51/0036; C08L 65/00; H01B 1/124; H01B 1/127; H01B 1/128
USPC ....................... 252/498–502, 519.21; 136/251
See application file for complete search history.

(56) References Cited

U.S. PATENT DOCUMENTS 5,035,926  A    7/1991  Jonas et al.
5,300,575  A    4/1994  Jonas et al.
(Continued)

FOREIGN PATENT DOCUMENTS

EP    0 440 957         12/1990
EP    1 634 922 A1       3/2006
(Continued)

OTHER PUBLICATIONS

International Search Report mailed May 11, 2010, issue in International Application No. PCT/JP2010/052353.
(Continued)

*Primary Examiner* — Harold Pyon
*Assistant Examiner* — Danny N Kang
(74) *Attorney, Agent, or Firm* — Stein IP, LLC

(57) ABSTRACT

The purpose is to provide a technique which enables various kinds of conductive polymer composition to be dissolved in an organic solvent and to be used to form a conductive membrane on a target portion easily. Provided is a composite conductive polymer composition, a method of manufacturing the same, and a solution obtained by dissolving the composition in an aromatic solvent, ester-based solvent or ketone-based solvent. The composition is obtained by doping a π-conjugated polymer (β) with a polymer compound (A), wherein the polymer compound (A) is obtained from (a-1) a monomer having a sulfonic acid group and a polymerizable vinyl group in an amount of 20 to 60 mol %, (a-2) a polar monomer having a hydrophilic group and a polymerizable vinyl group in an amount of 20 to 60 mol %, and (a-3) another polymerizable monomer in an amount of 20 to 60 mol %, and the n-conjugated polymer (β) is obtained from a monomer compound selected from the formulas (I) to (III)

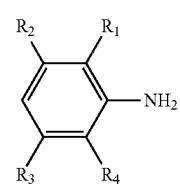

(I)

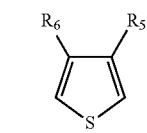

(II)

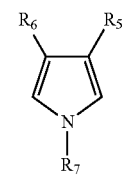

(III)

in the formula (I) to (III), at least one of $R_1$ to $R_4$ represent an alkoxy group of $C_1$ to $C_{10}$, and the other groups represent H, an alkyl group of $C_1$ to $C_{10}$, or an alkoxy group of $C_1$ to $C_{10}$; at least one of $R_5$ and $R_6$ represent an alkoxy group of $C_1$ to $C_{10}$, and the other group represents H, an alkyl group or an alkoxy group of $C_1$ to $C_{10}$, or $R_5$ and $R_6$ jointly represent an alkylenedioxy group of $C_1$ to $C_8$; and $R_7$ represents H, an alkyl group of $C_1$ to $C_6$, or an aromatic ring group.

10 Claims, No Drawings

(51) Int. Cl.
    *C08F 220/38*     (2006.01)
    *C08G 73/02*     (2006.01)
    *C08L 33/14*     (2006.01)
    *C08L 65/00*     (2006.01)
    *C08L 79/02*     (2006.01)
    *H01M 4/60*     (2006.01)
    *H01G 11/48*     (2013.01)

(52) U.S. Cl.
    CPC ... *C08G 73/0266* (2013.01); *C08G 2261/3221* (2013.01); *C08G 2261/3223* (2013.01); *C08G 2261/51* (2013.01); *C08G 2261/794* (2013.01); *C08L 33/14* (2013.01); *C08L 65/00* (2013.01); *C08L 79/02* (2013.01); *H01B 1/128* (2013.01); *H01M 4/608* (2013.01); *H01G 11/48* (2013.01); *Y02E 60/13* (2013.01)

(56) References Cited

U.S. PATENT DOCUMENTS

| | | |
|---|---|---|
| 6,489,412 B1 | 12/2002 | Okamoto et al. |
| 7,118,690 B2 | 10/2006 | Wessling et al. |
| 7,683,124 B2 | 3/2010 | Wessling |
| 7,771,621 B2 | 8/2010 | Kuramoto et al. |
| 2003/0118829 A1 | 6/2003 | Hsu |
| 2008/0014528 A1 | 1/2008 | Bailey et al. |
| 2008/0105854 A1 | 5/2008 | Huh et al. |
| 2008/0142074 A1* | 6/2008 | Maruyama et al. ........... 136/252 |

FOREIGN PATENT DOCUMENTS

| | | |
|---|---|---|
| EP | 2 452 982 A1 | 5/2012 |
| EP | 2 452 983 A1 | 5/2012 |
| JP | 63-214333 A | 9/1988 |
| JP | 64-69621 | 3/1989 |
| JP | 1-313521 | 12/1989 |
| JP | 05-262981 | 10/1993 |
| JP | 7-90060 | 4/1995 |
| JP | 2000-344823 | 12/2000 |
| JP | 2004-514753 | 5/2004 |
| JP | 2004-307722 | 11/2004 |
| JP | 2004307722 A * | 11/2004 |
| JP | 2005-508418 | 3/2005 |
| JP | 2006-155907 | 6/2006 |
| JP | 2007-518859 | 7/2007 |
| JP | 2007-314606 | 12/2007 |
| JP | 2008-121014 | 5/2008 |
| JP | 2008-169255 | 7/2008 |
| JP | 2008-179809 | 8/2008 |
| WO | WO 00/53656 | 9/2000 |
| WO | WO 2005/052058 | 6/2005 |
| WO | WO 2007/050568 A2 | 5/2007 |
| WO | WO 2008/010978 | 1/2008 |
| WO | WO 2008/022908 A1 | 2/2008 |
| WO | WO 2010/095650 A1 | 8/2010 |
| WO | WO 2010/095651 A1 | 8/2010 |
| WO | WO 2010/095652 A1 | 8/2010 |

OTHER PUBLICATIONS

Japanese Office Action dated Aug. 6, 2013, issued in corresponding Japanese Patent Application No. 2011-500627.
Notification of Reasons for Refusal dated Mar. 5, 2013, issued in corresponding Japanese Patent Application No. 2011-500627.
European Search Report mailed Apr. 14, 2014, for the corresponding European Application No. 10743775.8.
European Office Action dated Feb. 6, 2015, issued to European Application No. 10 743 775.8-1302.
International Search Report for PCT/JP2010/052352; mailed May 11, 2010; 2 pages.
European Search Report mailed Nov. 5, 2013 in corresponding European Application No. 10743774.1-1302 / 2399957.
U.S. Appl. No. 13/147,778, filed Aug. 2011, Hikaru Meguro et al., Soken Chemical & Engineering Co., Ltd.

* cited by examiner

COMPOSITE CONDUCTIVE POLYMER COMPOSITION, METHOD OF MANUFACTURING THE SAME, SOLUTION CONTAINING THE COMPOSITION, USE OF THE COMPOSITION

CROSS-REFERENCE TO RELATED APPLICATIONS

This application claims the benefit of PCT International Patent Application No. PCT/JP2010/052353, filed Feb. 17, 2010, and Japanese Patent Application No. 2009-033644, filed Feb. 17, 2009, in the Japanese Intellectual Property Office, the disclosures of which are incorporated herein by reference.

BACKGROUND OF THE INVENTION

1. Field of the Invention

The invention relates to a composite conductive polymer composition, a method of manufacturing the same, a solution containing the composition, and a use of the composition, and more specifically relates to a composite conductive polymer composition which is obtained by doping, with a polymer compound, a π-conjugated polymer whose monomer component is aniline, thiophene, pyrrole, or like an aromatic or a heterocyclic compound having an alkoxy group in order to solubilize the π-conjugated polymer to a solvent, a method of manufacturing the same, a solution containing the composition, and a use of the composition for an electrode for a dye-sensitized solar cell or an antistatic film.

2. Description of the Related Art

In order to enhance conductivity of a π-conjugated polymer, it is necessary to dope the polymer with a dopant. However, the polymer having extended π-conjugation has high planarity in the polymer chain, and thus the tendency of the crystallization or stacking of the polymer chains is high because of the affinity of the π-bonds. In addition, doping of the π-conjugated polymer with a dopant enhances the planarity and the affinity by the π-conjugation, and thus enhances the tendency of the stacking. Therefore, it was a difficult problem to enhance the solubility (by heat or solvent) of the π-conjugated polymer while enhancing the electric conductivity.

Here, there has been proposed a polymer in which an alkyl group, an alkoxy group, or the like is introduced on the side chain of a π-conjugated polymer (Patent Document 1). However, doping is necessary to enhance the electric conductivity to ten to the negative fifth power (s□m) or less, at which the polymer can be called a conductor. The doping enhances the planarity and the π-conjugation affinity, and thus there occurs a problem that sufficient solubility to a solvent cannot be achieved.

In view of the use of the conductive polymer and in view of the easiness of the handling, it is desirable that the polymer is soluble to a solvent or meltable by heat, and in addition a self-supported film or self-supported molded body with sufficient electric conductivity after molding or film formation can be obtained. Conventionally, when these conductive polymers are used, a polymer film is formed on a substrate by direct electropolymerization or vapor exposure to provide conductivity to the substrate, or thin film polymerization is performed by immersing the substrate in a solution of an oxidizing agent and a conductive polymer precursor monomer, followed by heating and so on. Thereafter, the obtained polymer film is processed by doping and so on.

However, the substrate needs to be semiconductor or conductor to perform the electropolymerization, and the corrosion resistance to the electrolyte is also required, and therefore, the choice of the substrate is limited. Furthermore, the thin film polymerization by direct vapor requires that an oxidizing agent exists uniformly on a thin film which is a polymerization field, and is not satisfactory in terms of the film formation control. In a polymer capacitor application, microasperity is formed on the surface in order to increases the surface area, and it is difficult to form a conductive polymer on a sufficiently uniform surface.

There has been proposed several methods of dissolving a conductive polymer in an organic solvent. Patent Document 2 discloses a method of manufacturing poly(3,4-di-substituted thiophene) by use of 3,4-di-substituted thiophene, an inorganic ferric salt and an oxidizing agent. Patent Document 3 discloses a water dispersible powder including a polymer T mainly having repeating thiophene units and at least one other polyanion polymer P. However, the method in Patent Document 2 is a method of obtaining powder or a method of performing oxidative polymerization directly on the target surface, and thus it is impossible to dissolve the polymer obtained by the method in a solvent or water. Furthermore, the product obtained by the method in Patent Document 3 is just a water dispersible dispersoid, and is not soluble to an organic solvent at the molecular level Furthermore, various researches have been made for more direct method of nanodispersing to a solvent. Patent Document 4 disclose a method of providing a microdispersoid solution at nano level by pulverizing polyaniline, which is essentially insoluble to a solvent, to nano level, and co-dispersing, to a solvent, the pulverized polyaniline with a dispersant of a sulfonic acid anion emulsifier such as SDS (dodecylbenzenesulfonic acid) or PTS (para-toluenesulfonic acid) having high affinity to polyaniline and a solvent. However, the polyaniline is not substantially dissolved in the solvent, and thus the surface of the coating film is uneven, and it is not possible to form a self-supported film (also referred to as a homogeneous film. This means a film formed by itself and without forming pinholes), and therefore it is not possible to form a film after coating unless combined with a binder.

Furthermore, Patent Document 5 discloses a polythiophene solution containing, in water or a mixed solvent of water and an organic solvent miscible to water, polythiophene having a molecular weight of 2,000 to 500,000 and obtained by oxidation chemical polymerization in the present of a polyanion of a polystyrene sulfonic acid, and a polyanion having a molecular weight of 2,000 to 500,000 and derived from a polystyrene sulfonic acid.

The Patent Document proposes a method of manufacturing poly(ethylenedioxide-substituted thiophene) (PEDOT) which is soluble or dispersible to water or an alcohol solvent by use of oxidative polymerization in the present of polystyrene sulfonic acid (PSS) and an oxidizing agent. However, the obtained PEDOT/PSS is dispersed in water, but not completely dissolved, and thus it is difficult to suppress partial stacking between PEDOTs, and therefore dissolution of the conductive polymer was insufficient. In addition, by use of the polystyrene sulfonic acid shown in the Patent Document, it is difficult to use a solvent other than a solvent having a strong ion dissociation property or water. Furthermore, a sulfonic acid group acts as a dopant group or a water-soluble functional group, but does not substantially have affinity or compatibility to the monomer. There is no functional group compatible with an alkoxyl group in order to control localization of an alkoxyl group of an aromatic or a heterocyclic compound, such as aniline, thiophene, or pyrrole, having an alkoxyl group and suppress the planarity of the π-conjugated polymer. Therefore, sufficient suppression of the stacking is difficult.

Furthermore, Patent Document 6 disclose a method of forming an organic solution by performing oxidative polymerization of aniline or aniline derivative in a solvent containing an organic acid or inorganic acid in the present of a strongly hydrophobic anionic surfactant, followed by precipitation, isolation, and purification, and thereafter performing extraction by use of an organic solvent immiscible to water.

However, the emulsifier used in the Patent Document is a low-molecular sulfonic acid-based, and aniline is hydrochlorinated before polymerization, thereafter the aniline salt is subjected to salt substitution by use of a sulfonic acid-based emulsifier. However, in reality, sufficient salt exchange is hard to occur, and therefore polyanion obtained by the synthetic method of the Patent Document is insoluble to a solvent, and thus only solvent dispersion in a micro dispersing state is obtained, which is problematic. In addition, the sulfonic acid-based emulsifier is used in an equivalent molar amount to aniline, and thus 50% or more of the emulsifier remains unused for doping, and the unused emulsifier needs to be removed upon use. Therefore, the washing process is complicated, which is problematic. Furthermore, it is very difficult to design the low-molecular emulsifier in a way to introduce a function to enhance solubility to a solution, and a function to suppress the stacking of polyaniline. Even though polyaniline is dissolved temporarily in a solvent, micro-agglomeration due to the stacking (crystallization of PANI) occurs shortly, which is problematic. Furthermore, the present inventors conducted the re-test and confirmed that according to the method of the Patent Document, the localization of an alkoxyl group in the aniline derivative having an alkoxyl group, and chemical and structural relaxation of affinity at quinoimide binding position and amino binding position of the polyaniline are insufficient, and therefore the stacking is not suppressed.

Furthermore, Patent Document 7 discloses a method of emulsifying a solution obtained by dissolving, in water or an organic solvent, (A) a monomer having a sulfonic acid functional group and a radical polymerizable functional group, and (B) a monomer of aniline or the derivatives thereof; introducing, in the monomer (B), a sulfonic acid structure derived from the monomer (A), and thereafter polymerize the monomers (A) and (B) in the present of a polymerization initiator to obtain a conductive polymer with the polymer of (B) and the polymer of (B) intertwined.

However, in the method of the Patent Document, because ammonium persulfate salt is used as a water-soluble oxidizing agent and a radical initiator, it is difficult in reality to obtain the ideal mesh structure of the vinyl-based polymer and polyaniline as mentioned in the specification. Therefore, according to the method of the Patent Document, there's a problem in reality that a substantial amount of vinyl polymer not containing PANI exists, and a dope monomer not incorporated in the vinyl polymer exists in PANI, and thus the obtained product is very nonuniform and unstable.

For example, Patent Document 8 discloses a conductive polyaniline composition containing (a) a protonated and substituted or unsubstituted polyaniline complex and (b) a compound having a phenolic hydroxyl group, which is dissolved in an organic solvent substantially immiscible to water.

However, the conditions for the solvent effective in the Patent Document cannot be applied to a solvent somewhat miscible to water. In addition, the applicable monomer needs to be highly oil-soluble or needs to have a highly oil-soluble alkyl group. Therefore, for a monomer having a hydrophilic substituent such as an alkoxyl group, sufficient function cannot be expected under the conditions of the polymerization solvent and the dopant compound representing a sulfonic acid group.

By the way, the conductive polymer composition can be used for a counter electrode for a dye-sensitized solar cell and an antistatic film. Patent Document 10 discloses a counter electrode for a dye-sensitized solar cell having a conductive polymer layer on a plastic film provided with a transparent conductive layer.

In the Patent Document, the conductive polymer layer is formed by applying a dispersion containing a conductive polymer, and removing the solvent. However, because the conductive polymer is a layer in which fine particles are dispersed, and thus the adherence to the transparent conductive layer is low, and thus it is necessary to enhance the surface energy of the transparent conductive layer by plasma treatment or the like. In addition, polystyrene sulfonic acid is used as a dispersant in Examples of the Patent Document. In this case, there exists a free sulfonic acid which does not contribute to doping of the conductive polymer, and thus the solvent becomes an aqueous solution. Therefore, when the solution is applied on a film substrate, the range of choice of the solvent and the film substrate surface is very broad, and thus pinholes due to nonuniformity of the conductive polymer coating film easily occur. In addition, because the polarity of the coating film is high due to the remaining sulfonic acid group, the coating film has low durability to acetonitrile and an ionic liquid which are commonly used as a electrolyte solution, and therefore peeling of the coating film easily occurs. Because of such causes, there occurs a problem that a transparent conductive film is corroded by iodine in the electrolyte. Therefore, the conductive polymer layer has a problem in the long-term stability as a counter electrode, and thus is insufficient to replace a platinum counter electrode with.

Furthermore, Patent Document 11 discloses an antistatic film obtained by applying antistatic material containing a polythiophene compound, acidic polymer and sugar alcohol on a thermoplastic resin film.

However, in the Patent Document, the antistatic material contains a sugar alcohol as an essential component, and thus the transparency and antistatic property of the obtained antistatic film is good. However, because only acidic polymer such as polystyrene sulfonic acid is used as a doping agent to the polythiophene compound, the antistatic film continuously absorbs moisture, and therefore the adherence and the antistatic property can deteriorate, which is problematic.

PRIOR ART REFERENCE

Patent Document

[Patent Document 1] JP-A-2002-539287
[Patent Document 2] JP-A-H01-313521
[Patent Document 3] JP-A-2004-514753
[Patent Document 4] JP-A-2007-518859
[Patent Document 5] Japanese Patent No. 2636968
[Patent Document 6] JP-A-2008-169255
[Patent Document 7] JP-A-2007-314606
[Patent Document 8] WO2005/052058
[Patent Document 9] JP-A-2000-344823
[Patent Document 10] JP-A-2006-155907
[Patent Document 11] JP-A-2008-179809

SUMMARY OF THE INVENTION

So, the purpose of the present invention is to provide a conductive polymer composition which is excellent in solubility to a solvent, and can be used to form a self-supported film by itself, i.e. a homogeneous membrane or molded body without pinholes, and a method of manufacturing the same.

The present inventors have re-tested and researched on the aforementioned prior art to solve the aforementioned problems, and clarified the facts that following factors are necessary from the start of the conductive polymer synthesis to purification and redissolution to a solvent.

<1> It is necessary to use a sufficient amount of an electrolytic solvent in the polymerization field of a π-conjugated polymer and to stabilize and uniformize an anionic filed during oxidation;

<2> It is necessary to provide a field to control the stacking of the π-conjugated polymer during polymerization and to supply the monomer stably;

<3> The doping to the π-conjugated polymer proceeds actively in these polymerization field;

<4> Precipitation from the initial polymerization field electrolytic solvent such as water is possible during the doping process;

<5> The stacking of the main chain backbone of the π-conjugated polymer after the polymerization is prevented by a certain steric molecular hinderance;

<6> The steric hinderance factor itself does not have a tendency to be crystallized, and can be dissolved in a solvent or by heat and so on.

Then, as a result of the further investigation by the present inventors, it was found out that when a polymer compound obtained by copolymerizing specific monomers is used as an additive upon polymerization of a π-conjugated polymer, the polymer compound exerts a function as an emulsifier to uniformize the polymerization field, and also exerts a function as a doping agent, and in addition provides a suitable steric hinderance to the π-conjugated polymer, and thus it is possible to obtain a composite conductive polymer composition which is excellent in solubility to a specific solvent. In addition, the present inventors have found that the aforementioned conductive polymer composition can be used for a counter electrode for a dye-sensitized solar cell and an antistatic film. Thus, the present invention has been completed.

The present invention provides a composite conductive polymer composition obtained by doping a π-conjugated polymer (β) with a polymer compound (A); wherein the polymer compound (A) is obtained by polymerizing the following components (a-1) to (a-3):

(a-1) a monomer having a sulfonic acid group and a polymerizable vinyl group in an amount of 20 to 60 mol %, (a-2) a polar monomer having a hydrophilic group and a polymerizable vinyl group in an amount of 20 to 60 mol %, and (a-3) a polymerizable monomer other than the components (a-1) and (a-2) in an amount of 20 to 60 mol %; and the π-conjugated polymer (β) is obtained from a monomer compound selected from the formulas (I) to (III)

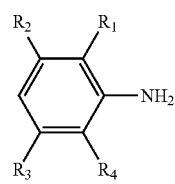

(I)

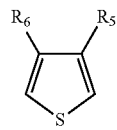

(II)

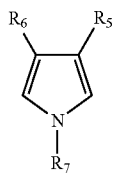

(III)

wherein, in the formulas (I) to (III), at least one of $R_1$ to $R_4$ represent an alkoxy group having a carbon number of 1 to 10, and the other groups represent a hydrogen atom, an alkyl group having a carbon number of 1 to 10, or an alkoxy group having a carbon number of 1 to 10;

at least one of $R_5$ and $R_6$ represent an alkoxy group having a carbon number of 1 to 10, and the other group represents a hydrogen atom, an alkyl group having a carbon number of 1 to 10 or an alkoxy group having a carbon number of 1 to 10, or $R_5$ and $R_6$ jointly represent an alkylenedioxy group having a carbon number of 1 to 8;

$R_7$ represents a hydrogen atom, an alkyl group having a carbon number of 1 to 6, or an aromatic ring group.

Furthermore, the present invention provides a method of method of manufacturing a composite conductive polymer composition comprising the steps of mixing a polymer compound (A) and a compound selected from the aforementioned formulas (I) to (III) in an electrolytic solvent, followed by chemical oxidative polymerization by use of an oxidizing agent; wherein the polymer compound (A) is obtained by polymerizing the following components (a-1) to (a-3):

(a-1) a monomer having a sulfonic acid group and a polymerizable vinyl group in an amount of 20 to 60 mol %, (a-2) a polar monomer having a hydrophilic group and a polymerizable vinyl group in an amount of 20 to 60 mol %, and (a-3) a polymerizable monomer other than the components (a-1) and (a-2) in an amount of 20 to 60 mol %.

Furthermore, the present invention provides a composite conductive polymer composition solution obtained by dissolving the aforementioned composite conductive polymer composition in an aromatic solvent, an ester-based solvent or a ketone-based solvent in an amount of 0.1 to 10 mass %.

Furthermore, the present invention provides a counter electrode for a dye-sensitized solar cell obtained from the aforementioned composite conductive polymer composition.

Furthermore, the present invention provides an antistatic film obtained from the aforementioned composite conductive polymer composition The composite conductive polymer obtained by polymerization by the effect of an oxidizing agent in the presence of the polymer compound of the invention stably dissolves in an aromatic solvent, an ester-based solvent, or a ketone-based solvent.

Therefore, it is possible to easily form a conductive membrane by applying a solution obtained by dissolving the composite conductive polymer in a solvent to a portion requiring conductivity, followed by volatilization of the solvent and drying.

Additional aspects and/or advantages of the invention will be set forth in part in the description which follows and, in part, will be obvious from the description, or may be learned by practice of the invention.

DETAILED DESCRIPTION OF THE EMBODIMENTS

The polymer compound (A) used in the invention can be manufactured by polymerizing, according to a common procedure, a component (a-1) monomer having a sulfonic acid group and a polymerizable vinyl group, a component (a-2) polar monomer having a hydrophilic group and a polymerizable vinyl group, and a component (a-3) polymerizable monomer other than these components in the presence of a polymerization initiator.

The component (a-1) monomer having a sulfonic acid group and a polymerizable vinyl group is a monomer having a styrenesulfonic acid group, a sulfoethyl group, or like a sulfonic acid group, and examples thereof include styrenesulfonic acid; sodium styrenesulfonate, potassium styrenesulfonate, calcium styrenesulfonate, and like stryrenesulfonate salts; 2-sulfoethyl(meth)acrylate; and sodium 2-sulfoethyl (meth)acrylate, potassium 2-sulfoethyl(meth) acrylate, calcium 2-sulfoethyl(meth)acrylate, and like 2-sulfoethyl(meth)acrylate salts.

The component (a-2) polar monomer having a hydrophilic group and a polymerizable vinyl group is a monomer whose pH is larger than 5.5 and smaller than 8.0 ($5.5<pH<8.0$) when the monomer is dissolved in distilled water of pH 7.0 at the room temperature in a concentration of 0.1 mmol/l. Examples thereof include acrylic acid, methacrylic acid, 2-(methacryloyloxy)ethylsuccinic acid, maleic acid (maleic anhydride), 2-hydroxyethyl(meth)acrylate, 2-hydroxypropyl(meth)acrylate, 4-hydroxybutyl(meth)acrylate, 2-acetoacetoxyethyl (meth)acrylate, methoxyethyl(meth)acrylate, ethoxyethyl (meth)acrylate, butoxyethyl(meth)acrylate, ethylcarbitol (meth)acrylate, methoxytriethyleneglycol(meth)acrylate, methoxypolyethyleneglycol(meth)acrylate, β-(meth)acryloyloxyethyl hydrogen succinate.

Furthermore, examples of the component (a-3) polymerizable monomer other than the monomers (a-1) and (a-2) include a monomer having an aromatic group or an alicyclic group and a polymerizable vinyl group; and an alkyl methacrylate.

Examples of the monomer having an aromatic group or an alicyclic group and a polymerizable vinyl group include benzyl(meth)acrylate, phenoxyethyl(meth)acrylate, 2-(methyl phthalate)ethyl(meth)acrylate, 2-(ethyl phthalate)ethyl (meth)acrylate, cyclohexyl(meth)acrylate, dicyclopentanyl (meth)acrylate, dicyclopentanyloxyethyl(meth)acrylate, dicyclopentenyl(meth)acrylate, dicyclopentenyloxyethyl (meth)acrylate, isobornyl(meth)acrylate, t-butylcyclohexyl (meth)acrylate, cyclohexyl(meth)acrylate, (meth)acrylate morpholine, pentamethylpiperidinyl methacrylate, tetramethylpiperidinyl methacrylate, 1-adamantyl(meth)acrylate, 2-methyl-2-adamantyl(meth)acrylate, 2-ethyl-2-adamantyl (meth)acrylate, 3-hydroxy-1-adamantyl(meth)acrylate, styrene, dimethylstyrene, naphthalene (meth)acrylate, vinylnaphthalene, vinylpyridine, N-vinylcarbazole, vinyl-N-ethylcarbazole, vinylfluorene.

Examples of the alkyl methacrylate include methyl(meth) acrylate, ethyl(meth)acrylate, n-propyl(meth)acrylate, i-propyl(meth)acrylate, nbutyl(meth)acrylate, i-butyl(meth)acrylate, i-propyl(meth)acrylate, n-pentyl(meth)acrylate, i-pentyl (meth)acrylate, t-butyl(meth)acrylate, 2-ethylhexyl(meth) acrylate, isooctyl(meth)acrylate, lauryl(meth)acrylate, stearyl(meth)acrylate.

In manufacturing the polymer compound (A) of the invention, the amount of the component (a-1) is 20 to 60 mol %, and preferably 30 to 40 mol %, the amount of the component (a-2) is 20 to 60 mol %, and preferably 30 to 40 mol %, and the amount of the component (a-3) is 20 to 60 mol %, and preferably 30 to 40 mol %.

In manufacturing the polymer compound (A) used for the invention, the molar ratio of the monomer (a-1), the monomer (a-2), and, the monomer (a-3) is important. In other words, the polymer compound of the invention appropriately balances the emulsifying capacity depending on the polarity of the respective monomers upon the polymerization of the conductive polymer, the stability of the polymerization of the conductive polymer, the affinity to the conductive polymer backbone which influences the doping ratio, and so on, and influences the conductive polymer composition, and makes it soluble to a solvent.

Polymerization of the component (a-1), the component (a-2), and the monomer (a-3) can be performed through a publicly-known method. For example, the manufacturing can be performed by mixing the respective components, and adding a polymerization initiator thereto, and initiating polymerization by heating, light irradiation and so on.

A polymerization method for manufacturing the aforementioned polymer compound (A) is not in particular limited as long as the method can be performed in a state that the component (a-2) does not separate from the monomer mixture. Examples of the methods include a solution polymerization method, a bulk polymerization method, and a precipitation polymerization method.

The polymerization initiator used for the polymerization reaction is not in particular limited as long as it is soluble to the aforementioned respective components and the solvent used in the reaction. Examples of the polymerization initiator include benzoyl peroxide (BPO), and like oil-soluble peroxide thermal polymerization initiators, azobisisobutyronitrile (AIBN), and like oil-soluble azo thermal polymerization initiators, and azobis-cyano valeric acid (ACVA), and like water-soluble azo thermal polymerization initiators. When the ratio of water in the solvent of the solution polymerization is large, ammonium persulfate, potassium persulfate, and like water-soluble peroxide thermal polymerization initiators; hydrogen peroxide water, and so on can be used. Furthermore, ferrocene, amines, and like redox reagents can be used in combination.

The range of use of these polymerization initiators is 0.001 to 0.1 mol per 1 mole of the aforementioned compound. The polymerization initiator can be used in any of one-time addition, dropwise addition, and sequential addition. Furthermore, in the case of bulk polymerization or solution polymerization by use of a small amount of a solvent (50 wt % or less with respect to the monomer), a polymerization method by the combination of mercaptan and metallocene (Patent Document 9) is possible.

In addition, examples of the solvent used for the aforementioned polymerization reaction include methanol, ethanol, isopropyl alcohol, butanol, and like alcohol-based solvents; acetone, methyl ethyl ketone, methyl isobutyl ketone, and like ketone-based solvents; methyl cellosolve, ethyl cellosolve, propyleneglycol methyl ether, propyleneglycol ethyl ether, and like glycol-based solvents; and methyl lactate, ethyl acetate, ethyl lactate, and like ester-based solvents.

Furthermore, a chain transfer agent can be used with the polymerization initiator during the polymerization, and the chain transfer agent can be used to adjust the molecular weight. Any chain transfer agent can be used as long as it is soluble to the aforementioned monomer and the solvent, and examples of the chain transfer agent include dodecylmercaptan, heptylmercaptan, and like alkylthiols; mercaptopropionic acid (BMPA), and like water-soluble thiols each having a polar group; and α-styrene dimer (ASD), and like lipophilic radical suppressants.

Furthermore, the polymerization reaction is preferably performed at a temperature equal to or below the boiling point of the solvent used (except the case of bulk polymerization), for example at approx. 65 deg. C. to 80 deg. C. However, when bulk polymerization or polymerization performed by use of mercaptan and metal as in Patent Document 9 is employed, the polymerization reaction is preferably performed at 25 deg. C. to 80 deg. C.

The thus obtained polymer is purified when necessary to obtain the polymer compound (A). An example of the purification method is a method of removing lipophilic low-molecular impurities and an unreacted monomer, and low-molecular impurities by use of lipophilic poor solvent such as hexane, and thereafter precipitating the polymer by use of water-soluble poor solvent such as acetonitrile or methanol to remove the water-soluble impurities and the residue.

The reason why the purification is preferable is as follows. The polymer compound (A) is introduced into the conductive polymer composition as a doping agent and functions as a stacking suppressant and a solvent-solubilizing agent. Therefore, when a polymerization initiator residue, a monomer, an oligomer, an ununiform composition, and so on exist as residues after the polymerization, the function of the conductive polymer composition can deteriorates. Thus, these residues need to be removed. Then, as a result of the purification, there is obtained a solubilized state where a nonuniform radical polymer as in Patent Document 7 does not exist, and the composition of the uniform conductive polymer composition and the composition of the polymer compound (A) is uniformly compatibilized.

The GPC weight-average molecular weight of the obtained polymer compound (A) is preferably 3,000 to 100,000. When the weight-average molecular weight is less than 3,000, the function thereof as the polymer compound is insufficient. In contrast, when it is more than 100,000, the solubility thereof to the polymerization field (an acid aqueous solution) during the conductive polymer synthesis can be insufficient, and the solvent solubility of the polymer compound itself can decrease, and provide an adverse influence on the solubilizability of the conductive polymer.

The composite conductive polymer composition of the invention can be manufactured in the following way by use of the polymer compound (A) obtained by the aforementioned method. That is, the composite conductive polymer composition obtained by doping, with the polymer compound (A), the π-conjugated polymer (β) comprised of the compound represented by the formulas (I) to (III) as a monomer component can be obtained by dissolving the aforementioned polymer compound (A) in an electrolytic solvent; adding, to the obtained solution, the compound, represented by the formulas (I) to (III), which is a raw material for the π-conjugated polymer (β), and oxidizing it by an oxidizing agent.

Among the raw material compounds, the compound represented by the formula (I) is aniline having an alkoxy group as a substituent. Examples of the compound include o-anisidine, p-anisidine, m-anisidine, methoxyaniline, and butoxyaniline.

Furthermore, the compound represented by the formula (II) is thiophene having hydrogen, an alkoxy group or an alkylenedioxy group as a substituent. Examples of the compound include 3-methoxythiophene, 3,4-ethylenedioxythiophene, 3,4-propylenedioxythiophene, 3,4-dimethoxythiophene, 3,4-(2',2'-dimethylpropylene)dioxythiophene, and 3,4-(2',2'-diethylpropylene)dioxythiophene.

Furthermore, the compound represented by the formula (III) is pyrrole having hydrogen, an alkoxy group or an alkylenedioxy group as a substituent. Examples of the compound include 3,4-ethylenedioxypyrrole, and 3,4-propylenedioxypyrrole.

One example of the specific method of manufacturing the composite conductive polymer composition according to the present inventive method is a method of if necessary, acidifying ion-exchange water which is an electrolytic solvent; adding the above-obtained polymer compound (A) thereto; adding one or two or more of the raw material compounds represented by the formulas (I) to (III) thereto; and adding an oxidizing agent to cause oxidative polymerization. Depending on the solubility, of the polymer compound (A), to the ion-exchange water, acetone, methyl ethyl ketone, or like a ketone-based solvent; methanol, ethanol, isopropyl alcohol, or like an alcohol-based solvent; or like an organic solvent having high hydrophilicity may be used together.

Examples of the acidic component to acidify the electrolytic solvent in the aforementioned reaction include hydrochloric acid, sulfuric acid, perchloric acid, periodic acid, iron (III) chloride, iron(III) sulfate, and the amount thereof is about 0.5 to 4.0 mol per 1 mol of the compound of the formulas (I) to (III)

The oxidizing agent used for the reaction needs to be adjusted depending on the redox potential of the aromatic compound (monomer) forming the composite conductive polymer composition. Examples of the oxidizing agent include ammonium peroxodisulfate, potassium peroxodisulfate, sodium peroxodisulfate, iron(III) chloride, iron(III) sulfate, iron(III) tetrafluoroborate, iron(III) hexafluorophosphate, copper(II) sulfate, copper(II) chloride, copper(II) tetrafluoroborate, copper(II) hexafluorophosphate.

The ratio of the polymer compound (A) and the compounds (I) to (III) depends on the property of the finally obtained composite conductive polymer composition, and thus cannot be simply determined. However, an example of the preferred range can be represented in the following way by the molar ratio of the number of the sulfonic acid group in the polymer compound (A) and the compounds (I) to (III).

That is, the polymer compound (A) may be included in such a way that the molar ratio of the sulfonic acid group in the polymer compound (A) is 0.3 to 1.5 per 1 mol of the compound selected from the formulas (I) to (III).

Furthermore, the usage amount of the oxidizing agent is usually about 1.0 to 3.0 mol (the value when the oxidizing agent is assumed to be monovalent) per 1 mol of the compounds (I) to (III). However, depending on the degree of oxidation (degree of acidity), the usage amount may be 1 mol or less per 1 mol of the monomer. Such amount is sufficient for polymerization.

Furthermore, the preferred range of the temperature for the polymerization reaction to obtain the composite conductive polymer composition can vary because the amount of heat generation after the oxidation reaction and the easiness of hydrogen removal depend on the kind of the compounds (I) to (III).

In general, when the compound (I) is used, 40 deg. C. or less is preferable. When the compound (II) is used, 90 deg. C. or less is preferable. When the compound (III) is used, 20 deg. C. or less is preferable.

In order to increase the molecular weight of the composite conductive polymer composition, the reaction temperature can be lowered and the reaction time can be elongated. In order to decrease the molecular weight, the reaction temperature and time can be changed in the opposite way.

The thus obtained polymer is, as necessary, subjected to washing and so on, to obtain the composite conductive polymer composition which is the target object. As described later, this composition can dissolve in an aromatic solvent, an ester-based solvent and a ketone-based solvent in which the conventional conductive polymer composition did not dissolve.

An example of the method of utilizing the thus obtained composite conductive polymer composition of the invention is to obtain a composite conductive polymer composition solution by uniformly dissolving the composition in an aromatic solvent, an ester-based solvent, or a ketone-based solvent. The composite conductive polymer composition solution can be used to form an uniform conductive membrane on a specific portion by applying the composite conductive polymer composition solution on a portion on which a conductive membrane is desired to be formed; and volatilizing the solvent in the composition by means of drying or the like.

The aforementioned composite conductive polymer composition solution can be obtained preferably by dissolving the composite conductive polymer composition in benzene, toluene, xylene, or like an aromatic solvent, ethyl acetate, propyl acetate, butyl acetate, methyl lactate, ethyl lactate, or like an ester-based solvent, methyl ethyl ketone, cyclohexanon, cyclopentanone, or like a ketone-based solvent in an amount of about 0.1 to 10 mass %.

Furthermore, the aforementioned composite conductive polymer composition solution may further contain benzyl alcohol, phenol, m-cresol, o-cresol, 2-naphthol, 1-naphthol, guaiacol, 2,6-dimethylphenol, or like an aromatic compound having a hydroxyl group, in order to improve the stability of the solution and the conductivity in a state of a coating film. These compounds are preferably added in an amount of about 50 to 500 parts by weight per 100 parts by weight of the solvent of the composite conductive polymer composition solution.

Furthermore, the aforementioned composite conductive polymer composition solution may further contain, as a filler component, copper, silver, aluminum, platinum, or like a metal; titanium oxide, indium tin oxide, fluorine-doped tin oxide, alumina, silica, or like a metal oxide; conductive polymer composition, carbon nanotube (CNT), fullerene, carbon black, or like carbon powder or dispersoid, in order to improve the conductivity of the self-supported film as an antistatic coating material and improve the catalytic performance thereof as a counter electrode for a solar cell. These powder or dispersoid is preferably added in such a way that the solid content of the powder or dispersoid is about 0.01 to 50 parts by weight per 100 parts by weight of the solid content of the composite conductive polymer composition solution.

Furthermore, the aforementioned composite conductive polymer composition can be used for an counter electrode for a dye-sensitized solar cell. When transparency is required, the counter electrode for the dye-sensitized solar cell can be formed by laminating the composite conductive polymer composition on one side of a transparent substrate, or placing a transparent electrode on one side of a transparent substrate and laminating the composite conductive polymer composition on the transparent electrode. When transparency is not required, the counter electrode can be formed by laminating the composite conductive polymer composition on a metal foil and so on. The thickness of the composite conductive polymer composition is usually in the range of 0.01 to 100 μm and preferably in the range of 0.1 to 50 μm.

As the aforementioned transparent substrate, a film or plate having a light transmittance of usually 50% or more, and preferably 80% or more may be used. Examples of the transparent substrate includes glass, and like inorganic transparent substrates; polyethylene terephthalate (PET), polycarbonate (PC), polyphenylene sulfide, polysulfone, polyester sulfone, polyalkyl(meth)acrylate, polyethylene naphthalate (PEN), polyether sulfone (PES), polycycloolefin, and like polymer transparent substrates. Examples of the metal foil include gold, platinum, silver, tin, copper, aluminum, stainless-steel, nickel, and like metal foils.

The thickness of these transparent substrates is usually in the range of 200 to 7000 μm in the case of an inorganic transparent substrate, and usually in the range of 20 to 4000 μm, and preferably 20 to 2000 μm in the case of a polymer transparent substrate. The thickness is 0.1 μm to 1000 μm and preferably 1 μm to 500 μm in the case of a metal foil substrate. The polymer transparent substrate and metal foil substrate having such range of thickness can provide flexibility to the obtained dye-sensitized solar cell.

When necessary, a transparent electrode may be disposed on one side of the aforementioned transparent substrate. Examples of the transparent electrode used here include a film-shaped conductive metal electrode, a mesh-shaped conductive metal electrode.

The aforementioned film-shaped conductive metal electrode is film-shaped and formed of tin oxide, tin-doped indium oxide (ITO), fluorine-doped tin oxide (FTO) or the like. The film-shaped conductive metal electrode can by formed by vapor deposition or sputtering of tin oxide, ITO. FTO or the like on the surface of the transparent substrate. The thickness of the film-shaped conductive metal electrode is usually in the range of 0.01 to 1 μm, and preferably in the range of 0.01 to 0.5 μm.

On the other hand, the mesh-shaped conductive metal electrode is mesh-shaped and formed of copper, nickel, aluminum, or like conductive metal. Specifically, the mesh-shaped conductive metal electrode can be formed by use of copper, nickel, aluminum, or like conductive metal etched, for example by photolithography, to form a mesh having the line width of 10 to 70 μm, and preferably 10 to 20 μm and the pitch width of usually 50 to 300 μm, and preferably 50 to 200 μm. The thickness of the conducting wire of the mesh-shaped conductive metal electrode is approximately the same as that of the conductive metal used, and is usually in the range of 8 to 150 μm, and preferably 8 to 15 μm. The mesh-shaped conductive metal electrode can be adhered to the surface of the transparent substrate by use of adhesive or the like.

In manufacturing the counter electrode of the aforementioned dye-sensitized solar cell, the method of laminating the composite conductive polymer composition on one side of the aforementioned transparent substrate or on the transparent electrode disposed on one side of the transparent substrate is, for example, a method of, one time or plural times, applying the aforementioned composite conductive polymer composition solution on one side of the aforementioned transparent substrate or on the transparent electrode disposed on one side of the transparent substrate; and removing the solvent in the solution.

The aforementioned composite conductive polymer composition solution can be applied by use of a dip coater, a micro bar coater, a roll coater, a comma coater, a die coater, a gravure coater, or like a publicly-known coater.

The solvent may be removed by use of natural drying by leaving as it is, forced drying under heating conditions by hot-air or infrared light, or like method.

The aforementioned counter electrode for the dye-sensitized solar cell is excellent in productivity in that the aforementioned composite conductive polymer composition used for the counter electrode is soluble to an organic solvent, and thus is easier to be applied than a dispersion liquid in which a conventional composite conductive polymer composition is dispersed in an aqueous medium. Furthermore, it is possible to suppress corrosion deterioration which is caused by the acid aqueous solution in the counter electrode preparation stage.

Furthermore, the aforementioned counter electrode for the dye-sensitized solar cell is excellent in adhesion to the aforementioned transparent substrate, transparent electrode, and metal foil and thus can be used for a long time because the aforementioned composite conductive polymer composition used for the electrode uses the polymer compound (A) obtained by copolymerizing the aforementioned component (a-1), component (a-2) and component (a-3) in a predetermined range.

Furthermore, the aforementioned counter electrode for the dye-sensitized solar cell can be used for a long time because the use of the polymer compound (A) in the aforementioned composite conductive polymer composition, with reduced degree of acidity, obtained by copolymerizing the aforementioned component (a-1), component (a-2) and component (a-3) in a predetermined range suppresses corrosion of the transparent electrode (conductive metal) and improves durability to the electrolyte.

In addition, the aforementioned counter electrode for the dye-sensitized solar cell can be supplied at a low price because the use of the composite conductive polymer film as an uniform oxidation resistance film enables the use of various metals. This is in contrast to the prior art in which an expensive platinum electrode has been used as an electrode having oxidation resistance to the electrolyte.

Furthermore, by use of the aforementioned composite conductive polymer composition, it is possible to manufacture an antistatic film having low resistance because the aforementioned composite conductive polymer composition can be used to form a self-supported film by coating and drying by itself. In addition, when the composite conductive polymer composition is mixed with thermoplastic resin and/or thermosetting resin as necessary, the antistatic film can be obtained by (1) a method of melting-kneading the material by use of an extruder; and forming a film from the material by use of a T-die, or (2) a method of applying the aforementioned composite conductive polymer composition solution on one side or both sides of a film of thermoplastic resin, thermosetting resin, and glass; and removing the solvent in the solution to form an antistatic layer.

Examples of the thermoplastic resin used in the aforementioned antistatic film include polyolefin, polyvinyl chloride, polyvinylidene chloride, polystyrene, polyvinyl acetate, polytetrafluoro-ethylene, polyacrylonitrile-butadiene-styrene, polyacrylonitrile-styrene, polymethacryl, polyacryl, saturated polyester, polyamide, polycarbonate, modified polyphenylene ether, polyphenylene sulfide, polysulfone, polyarylate, liquid crystal polymer, polyether ether ketone, and polyamide-imide. Polymer alloy of these thermoplastic resins and thermoplastic elastomer are also included.

Examples of the thermosetting resin used in the aforementioned antistatic film include polyphenol, polyepoxy, unsaturated polyester, polyurethane, polyimide, polyurea, silicone resin, melamine resin, fluorine resin, alkyd resin.

Furthermore, it is possible to form an antistatic film with reduced variation in the property under various environmental conditions with high or low humidity and high transparency by use of the polymer compound (A) obtained by copolymerizing the aforementioned component (a-1), component (a-2) and component (a-3) in a predetermined range.

EXAMPLES

The present invention will be explained in more detail with reference to the following Examples, but the present invention is not limited by these Examples. The molecular weight and surface resistance value in the Examples and Comparative Examples are measured in the following way.

<Molecular Weight>

The molecular weight was measured by GPC under the following conditions.

Apparatus Name: HLC-8120 (manufactured by Tosoh Corporation)

Column: GF-1G7B+GF-510HQ (ASAHIPAK® a registered trademark of Showa Denko K.K.) (ASAHIPAK is a hard gel vinyl alcohol copolymer used for high performance liquid chromatography columns).

Reference Material: polystyrene and sodium polystyrenesulfonate

Sample Concentration: 1.0 mg/ml

Eluent: 50 millimole lithium chloride aqueous solution/$CH_3CN$=60/40 wt

Flow Rate: 0.6 ml/min

Column Temperature: 30 deg. C.

Detector: UV254 nm

<Surface Resistance>

The surface resistance was measured by use of Low Resistivity Meter Loresta GP, PSP type probe manufactured by Dia Instruments Co., Ltd. and by the four-terminal four-probe method.

Synthesis Example 1

Polymerization of Polymer Compound

Styrenesulfonic acid (NaSS) (25 g), 2-hydroxyethyl methacrylate (2-HEMA) (20 g), phenoxyethyl methacrylate (PEMA) (55 g), ion-exchange water (100 g), isopropyl alcohol (IPA) (100 g), methyl ethyl ketone (MEK) (150 g) were added to a four-neck flask with a volume of 1000 $cm^3$ and having a stirrer, a nitrogen gas introducing tube, a reflux condenser, an inlet and a thermometer. While introducing nitrogen gas into the flask, and the mixture in the flask was heated to 70 deg. C. Thereafter, azobisisobutyronitrile (0.3 g) was added to the flask, and the polymerization reaction was conducted for 18 hours at 70 deg. C. to obtain a polymer solution (A-1).

Synthesis Example 2

Polymerization of Polymer Compound

The polymer solutions (A-2 to 14) were obtained by the method of the polymerization of the polymer compound as in Synthesis Example 1 except that the monomer and the polymerization solvent were changed as shown in Table 1. The polymer solution (A-1) obtained in Synthesis Example 1 is also shown in Table 1.

TABLE 1

| Polymer Solution | Monomer Composition | | | | | Polymerization Medium Composition | | |
|---|---|---|---|---|---|---|---|---|
| | Nass | 2-HEMA | 2-EHMA | PEMA | FA-513M | Water | IPA | MEK |
| A-1 | 25 (20) | 20 (25) | — | 55 (55) | — | 100 | 100 | 150 |
| A-2 | 28 (20) | 51 (60) | — | 21 (20) | — | 100 | 200 | — |
| A-3 | 26 (20) | 33 (40) | — | 41 (40) | — | 100 | 100 | 150 |
| A-4 | 64 (60) | 14 (20) | — | 18 (20) | — | 150 | 200 | — |
| A-5 | 42 (35) | 15 (20) | — | 43 (45) | — | 100 | 100 | 150 |
| A-6 | 44 (35) | 36 (45) | — | 20 (20) | — | 150 | 200 | — |
| A-7 | 25 (21) | 20 (26) | 29 (25) | 26 (28) | — | 100 | 100 | 150 |
| A-8 | 24 (21) | 22 (31) | 30 (28) | — | 24 (20) | 100 | 150 | 150 |
| A-9 | 19 (15) | 21 (26) | — | 60 (59) | — | 100 | 100 | 150 |
| A-10 | 77 (70) | 14 (20) | — | 9 (10) | — | 100 | 200 | — |
| A-11 | 57 (50) | 7 (10) | — | 36 (40) | — | 100 | 150 | 150 |
| A-12 | 28 (20) | 61 (70) | — | 11 (10) | — | 100 | 200 | — |
| A-13 | 13 (10) | 16 (20) | — | 71 (70) | — | 100 | 150 | 150 |
| A-14 | 19 (15) | 12 (15) | — | 69 (70) | — | 100 | 150 | 150 |

In Table 1, Nass represents styrenesulfonic acid, 2-HEMA represents 2-hydroxyethyl methacrylate, 2-EHMA represents 2-ethylhexyl acrylate, PEMA represents phenoxyethyl methacrylate, FA-531M represents dicyclopentenyl methacrylate (FANCRYL (registered trademark) FA-513M, manufactured by Hitachi Chemical Co., Ltd.). Values in Table 1 represent mass %, and values in the parathesis of Table 1 represent molar fraction.

Synthesis Example 3

Purification of Polymer Compound

The polymer compound powder AP-1 to 14 were obtained by one of the methods shown below from the polymer solution A-1 to 14 obtained in Synthesis Examples 1 and 2. The weight-average molecular weight (Mw) of the obtained powder measured by the gel permeation chromatography (GPC) is shown in Table 2.

[Purification Method A]
The total amount of the obtained polymer solution was moved to a 2000 cm$^3$ beaker, and acetone (600 g) was added thereto while stirring by a stirrer, and thereafter the stirring was stopped to obtain a precipitate. The precipitate was subjected to filtration under reduced pressure, and the residue was dried for 24 hours at 100 deg. C. by use of a dryer, followed by pulverization by use of a mortar, to obtain powder of the polymer compound.

[Purification Method B]
The total amount of the obtained polymer solution was moved to a 2000 cm$^3$ beaker, and IPA (600 g) was added thereto while stirring by a stirrer, and thereafter the stirring was stopped to obtain a precipitate. The precipitate was subjected to filtration under reduced pressure, and the residue was dried for 24 hours at 100 deg. C. by use of a dryer, followed by pulverization by use of a mortar, to obtain powder of the polymer compound.

[Purification Method C]
The total amount of the obtained polymer solution was moved to a 2000 cm$^3$ beaker, and ion-exchange water (100 g) and hexane (500 g) were added thereto while stirring by a stirrer, and thereafter the mixture was left still for 1 hour and a hexane layer containing impurities was removed. The solution in the aqueous layer side was moved to an evaporator, and IPA was distilled away. Again, the total amount of the remaining liquid was moved to a 2000 cm$^3$ beaker, and acetone (400 g) was added thereto while stirring by a stirrer. Thereafter, the stirring was stopped to obtain a precipitate. The precipitate was subjected to filtration under reduced pressure, and the residue was dried for 24 hours at 100 deg. C. by use of a dryer, followed by pulverization by use of a mortar, to obtain powder of the polymer compound.

TABLE 2

| | Polymer Solution | Purification Method | Mw |
|---|---|---|---|
| AP-1 | A-1 | A | 50,000 |
| AP-2 | A-2 | A | 41,000 |
| AP-3 | A-3 | A | 45,000 |
| AP-4 | A-4 | B | 40,000 |
| AP-5 | A-5 | A | 44,000 |
| AP-6 | A-6 | B | 44,000 |
| AP-7 | A-7 | A | 42,000 |
| AP-8 | A-8 | A | 44,000 |
| AP-9 | A-9 | A | 47,000 |
| AP-10 | A-10 | C | 38,000 |
| AP-11 | A-11 | C | 42,000 |
| AP-12 | A-12 | C | 39,000 |
| AP-13 | A-13 | A | 44,000 |
| AP-14 | A-14 | A | 43,000 |

Example 1

The polymer compound (AP-1) (3.3 g) which was obtained in Synthesis Example 3, ion-exchange water (500 g), 25% hydrochloric acid aqueous solution (1.46 g) was added to a four-neck flask with a volume of 1000 cm$^3$ and having a stirrer, a nitrogen gas introducing tube, a reflux condenser, an inlet and a thermometer. The mixture was heated to 60 deg. C., and was stirred for 3 hours, and thereafter was cooled to 25 deg. C. The solution in the flask was uniform and transparent.

After that, 3,4-ethylenedioxythiophene (1.42 g) was added to the solution in the flask, and the mixture was stirred to obtain an uniform emulsified liquid, and thereafter heated to 80 deg. C. Then, 14.3 g of iron(III) sulfate n-hydrate was added to the flask, and the polymerization reaction was continued for 48 hours at 80 deg. C.

After the polymerization reaction, the total amount of the reaction solution was filtered under reduced pressure, and the residue was moved to a 500 cm$^3$ beaker, and thereafter acetonitrile (100 g) and ion-exchange water (100 g) were added thereto, and then the resultant mixture was stirred for 30 minutes, and was subjected to filtration under reduced pressure. The residues were dried under reduced pressure for 24 hours at 70 deg. C., to obtain a composite conductive polymer composition (E-1).

Example 2

The polymer compound (AP-2) (2.95 g) which was obtained in Synthesis Example 3, ion-exchange water (500 g), 25% hydrochloric acid aqueous solution (1.46 g) was added to a four-neck flask with a volume of 1000 cm$^3$ and having a stirrer, a nitrogen gas introducing tube, a reflux condenser, an inlet and a thermometer. The mixture was heated to 60 deg. C., and was stirred for 3 hours, and thereafter was cooled to 25 deg. C. The solution in the flask was uniform and transparent.

After that, 3,4-ethylenedioxythiophene (1.42 g) was added to the solution in the flask, and the mixture was stirred to obtain an uniform emulsified liquid, and thereafter heated to 80 deg. C. Then, 4.1 g of iron(III) chloride was dissolved in ion-exchange water (30 g), and the solution was dripped over 2 hours in the flask at 80 deg. C. After the dripping, the polymerization reaction was continued for 48 hours at 80 deg. C.

After the polymerization reaction, the total amount of the reaction solution was filtered under reduced pressure, and the residue was moved to a 500 cm$^3$ beaker, and thereafter ion-exchange water (100 g) were added thereto, and then the resultant mixture was stirred for 30 minutes, and was subjected to filtration under reduced pressure. These procedures were repeated two more times, and thereafter the residue was moved to a 500 cm$^3$ beaker and acetonitrile (100 g) was added thereto, and then the resultant mixture was stirred for 30 minutes, and was subjected to filtration under reduced pressure. The residues were dried under reduced pressure for 24 hours at 70 deg. C., to obtain a composite conductive polymer composition (E-2).

Example 3

The composite conductive polymer composition (E-3) was obtained in the same way as in Example 2 except that the polymer compound (AP-2) (2.95 g) was replaced with the polymer compound (AP-3) (3.17 g).

Example 4

The composite conductive polymer composition (E-4) was obtained in the same way as in Example 2 except that the polymer compound (AP-2) (2.95 g) was replaced with the polymer compound (AP-4) (1.29 g) and ion-exchange water (500 g) was replaced with ion-exchange water (400 g) and 25 deg. C. saturated saline (100 g).

Example 5

The composite conductive polymer composition (E-5) was obtained in the same way as in Example 2 except that the polymer compound (AP-2) (2.95 g) was replaced with the polymer compound (AP-5) (1.96 g).

Example 6

The composite conductive polymer composition (E-6) was obtained in the same way as in Example 2 except that the polymer compound (AP-2) (2.95 g) was replaced with the polymer compound (AP-6) (1.87 g).

Example 7

The polymer compound (AP-7) (3.30 g) which was obtained in Synthesis Example 3, ion-exchange water (500 g), 25% hydrochloric acid aqueous solution (1.46 g) was added to a four-neck flask with a volume of 1000 cm$^3$ and having a stirrer, a nitrogen gas introducing tube, a reflux condenser, an inlet and a thermometer. The mixture was heated to 60 deg. C., and was stirred for 3 hours, and thereafter was cooled to 25 deg. C. The solution in the flask was uniform and transparent.

After that, o-anisidine (1.23 g) was added to the solution in the flask, and the mixture was stirred to obtain an uniform emulsified liquid, and thereafter cooled to 0 deg. C. Then, 3.00 g of ammonium persulfate was dissolved in ion-exchange water (30 g), and the solution was dripped over 2 hours in the flask at 0 deg. C. After the dripping, the polymerization reaction was continued for 48 hours at 0 deg. C.

After the polymerization reaction, the total amount of the reaction solution was filtered under reduced pressure, and the residue was moved to a 500 cm$^3$ beaker, and thereafter ion-exchange water (100 g) were added thereto, and then the resultant mixture was stirred for 30 minutes, and was subjected to filtration under reduced pressure. These procedures were repeated two more times, and thereafter the residue was moved to a 500 cm$^3$ beaker and acetonitrile (100 g) was added thereto, and then the resultant mixture was stirred for 30 minutes, and was subjected to filtration under reduced pressure. The residues were dried under reduced pressure for 24 hours at 70 deg. C., to obtain a composite conductive polymer composition (E-7).

Example 8

The composite conductive polymer composition (E-8) was obtained in the same way as in Example 7 except that the polymer compound (AP-7) (3.30 g) was replaced with the polymer compound (AP-8) (3.43 g) and o-anisidine 1.23 g was replaced with 3,4-ethylenedioxypyrrole (1.25 g).

Comparative Example 1

The comparative conductive polymer composition (C-1) was obtained in the same way as in Example 2 except that the polymer compound (AP-2) (2.95 g) was replaced with the polymer compound (AP-9) (4.34 g).

Comparative Example 2

Polymerization was performed in the same way as in Example 2 except that the polymer compound (AP-2) (2.95 g) was replaced with the polymer compound (AP-10) (1.07 g).

After the polymerization reaction, no solid precipitate was found from the polymerization solution. So, the total amount of the reaction solution was moved to an evaporator, and the reaction solution was heated and distilled under reduced pressure so as to reduce the volume to 50 g. Then, insoluble substances precipitated in the reaction solution. The resultant reaction solution was filtered under reduced pressure. Then, the residue was moved to a 200 cm$^3$ beaker, ion-exchange water (50 g) was added thereto, and then the resultant mixture was stirred for 30 minutes, and was subjected to filtration under reduced pressure. Such water washing and filtration under reduced pressure was conducted one more time, and the residue was moved to a 200 cm$^3$ beaker, and n-hexane (50 g) was added thereto, and the mixture was stirred for 30 minutes, and was subjected to filtration under reduced pressure. The residues were dried under reduced pressure for 24 hours at 70 deg. C., to obtain the comparative composite conductive polymer composition (C-2).

Comparative Example 3

The comparative conductive polymer composition (C-3) was obtained in the same way as in Example 2 except that the polymer compound (AP-2) (2.95 g) was replaced with the polymer compound (AP-11) (1.44 g).

Comparative Example 4

The comparative conductive polymer composition (C-4) was obtained in the same way as in Example 2 except that the polymer compound (AP-2) (2.95 g) was replaced with the polymer compound (AP-12) (2.94 g).

Comparative Example 5

The comparative conductive polymer composition (C-5) was obtained in the same way as in Example 2 except that the polymer compound (AP-2) (2.95 g) was replaced with the polymer compound (AP-13) (6.34 g).

Comparative Example 6

The comparative conductive polymer composition (C-6) was obtained in the same way as in Example 2 except that the polymer compound (AP-2) (2.95 g) was replaced with the polymer compound (AP-14) (4.34 g).

Examples 9 to 16 and Comparative Examples 7 to 12

Preparation and Evaluation of Conductive Polymer Composition Solution

The composite conductive polymer composition obtained in Examples 1 to 8 and the comparative conductive polymer composition obtained in Comparative Examples 1 to 6 (E-1 to 8, C-1 to 6) (2 g) and the solvent shown in Table 3 below were added to a 200 cm$^3$ beaker, and they were stirred and dissolved at room temperature to obtain a conductive polymer composition solution. The compositions C1 to C6 (Comparative Examples 7 to 12) did not dissolve in any one of the five kinds of solvents shown in Table 3, and did not dissolve in the mixture solvent thereof, and thus they existed in a micro-dispersion state.

Thereafter, the conductive polymer composition solution or micro-dispersion was applied on a glass substrate by use of a doctor blade so that the thickness after drying was 10 μm, and dried. The state of the film and the measured surface resistance are shown in Table 4.

TABLE 3

|  | Conductive Polymer Composition | Solvent | | | | | State of Solution |
|---|---|---|---|---|---|---|---|
|  |  | To | IPA | MeOH | EtAc | MEK |  |
| Ex. 9 | E-1 | 91 | 9 | — | — | — | Blackish Green Uniform Solution |
| Ex. 10 | E-2 | 91 | — | 9 | — | — | Blackish Green Uniform Solution |
| Ex. 11 | E-3 | 91 | 9 | — | — | — | Blackish Green Uniform Solution |
| Ex. 12 | E-4 | — | — | 9 | — | 91 | Blackish Green Uniform Solution |
| Ex. 13 | E-5 | — | — | 9 | 91 | — | Blackish Green Uniform Solution |
| Ex. 14 | E-6 | — | — | 9 | — | 91 | Blackish Green Uniform Solution |
| Ex. 15 | E-7 | 91 | — | 9 | — | — | Blackish Red Uniform Solution |
| Ex. 16 | E-8 | 91 | 9 | — | — | — | Black Uniform Solution |
| Comp. Ex. 7 | C-1 | 91 | 9 | — | — | — | Black Micro-Dispersion |
| Comp. Ex. 8 | C-2 | 91 | 9 | — | — | — | Black Micro-Dispersion |
| Comp. Ex. 9 | C-3 | 91 | 9 | — | — | — | Black Micro-Dispersion |
| Comp. Ex. 10 | C-4 | 91 | 9 | — | — | — | Black Micro-Dispersion |
| Comp. Ex. 11 | C-5 | 91 | 9 | — | — | — | Black Micro-Dispersion |
| Comp. Ex. 12 | C-6 | 91 | 9 | — | — | — | Black Micro-Dispersion |

In Table 3, To represents toluene. IPA represents isopropyl alcohol. MeOH represents methyl alcohol. EtAC represents methyl acetate, and MEK represents methyl ethyl ketone.

TABLE 4

|  | Film Resistance (/□) | State of Coating Film |
|---|---|---|
| Ex. 9 | 15 kΩ | Blackish Green Uniform Coating Film |
| Ex. 10 | 15 kΩ | Blackish Green Uniform Coating Film |
| Ex. 11 | 30 kΩ | Blackish Green Uniform Coating Film |
| Ex. 12 | 25 kΩ | Blackish Green Uniform Coating Film |
| Ex. 13 | 15 kΩ | Blackish Green Uniform Coating Film |
| Ex. 14 | 20 kΩ | Blackish Green Uniform Coating Film |
| Ex. 15 | 200 kΩ | Blackish Red Uniform Coating Film |
| Ex. 16 | 350 kΩ | Black Uniform Coating Film |
| Comp. Ex. 7 | 10 MΩ or larger | Black Irregular Film |
| Comp. Ex. 8 | 10 MΩ or larger | Black Irregular Film |
| Comp. Ex. 9 | 10 MΩ or larger | Black Irregular Film |
| Comp. Ex. 10 | 10 MΩ or larger | Black Irregular Film |

TABLE 4-continued

| | Film Resistance (/□) | State of Coating Film |
|---|---|---|
| Comp. Ex. 11 | 10 MΩ or larger | Black Irregular Film |

TABLE 4-continued

| | Film Resistance (/□) | State of Coating Film |
|---|---|---|
| Comp. Ex. 12 | 10 MΩ or larger | Black Irregular Film |

Example 17 to Example 23 and Comparative Example 13 to Comparative Example 15

A dye-sensitized solar cell element was manufactured by replacing the counter electrode (copper mesh electrode having openings) and the counter electrode substrate (PET film having a thickness of 80 μm) used in Example 1 of International Publication WO/2009/013942 with a product obtained by applying the composite conductive polymer composition solution prepared in Examples 1 to 4 or the conductive polymer composition solution prepared in Comparative Examples 2 by use of a doctor blade on a SUS foil, an ITO PEN film, a glass substrate, an ITO glass substrate or a FTO glass substrate so that the thickness after drying was 5 μm.

The evaluation of the obtained dye-sensitized solar cell element was performed by use of a solar simulator YSS-80A manufactured by Yamashita Denso Corporation. The short-circuit current, open voltage, fill factor and power generation efficiency of the cell was evaluated by investigating the I-V characteristic under AM1.5 (1sun;100 mW/cm$^2$) irradiation to an element having a cell area of 1 cm$^2$. The result was shown in Table 1.

TABLE 5

| | Counter Electrode and Counter Electrode Substrate | Short-Circuit Current (Jsc/mA) | Open Voltage (Voc/V) | Fill Factor (FF) | Power Generation Efficiency (Eff/%) |
|---|---|---|---|---|---|
| Ex. 17 | ITO Glass Substrate + Composite Conductive Polymer Composition of Ex. 1 | 5.0 | 0.78 | 60 | 2.3 |
| Ex. 18 | ITO Glass Substrate + Composite Conductive Polymer Composition of Ex. 2 | 2.8 | 0.74 | 63 | 1.3 |
| Ex. 19 | SUS Foil + Composite Conductive Polymer Composition of Ex. 3 | 1.7 | 0.76 | 45 | 1.7 |
| Ex. 20 | ITO glass substrate + Composite Conductive Polymer Composition of Ex. 4 | 3.2 | 0.76 | 64 | 1.6 |
| Ex. 21 | FTO Glass Substrate + Composite Conductive Polymer Composition of Ex. 1 | 3.2 | 0.76 | 64 | 1.6 |
| Ex. 22 | ITO PEN Film + Composite Conductive Polymer Composition of Ex. 1 | 2.6 | 0.80 | 48 | 1.0 |
| Ex. 23 | Glass Substrate + Composite Conductive Polymer Composition of Ex. 1 | 1.1 | 0.74 | 67 | 0.5 |
| Comp. Ex. 13 | ITO Glass Substrate + Conductive Polymer Composition of Comp. Ex. 2 | 1.3 | 0.80 | 10 | 0.1 |
| Comp. Ex. 14 | ITO Glass Substrate | 1.3 | 0.56 | 7 | 0.05 |
| Comp. Ex. 15 | FTO Glass Substrate | 1.3 | 0.56 | 7 | 0.05 |

As shown above, the dye-sensitized solar cell element obtained by use of the composite conductive polymer composition of the invention exhibited high photoelectric conversion efficiency.

Example 24 to Example 25 and Comparative Example 16 to Comparative Example 17

An antistatic film was manufactured by adjusting, to 2.5%, the solid content of the composite conductive polymer composition solution prepared in Examples 1 to 2, and the conductive polymer composition solution prepared in Comparative Examples 4 to 5, and applying the adjusted solution on a glass substrate having a thickness of 1000 μm and a PET film substrate having a thickness of 100 μm, and removing the solvent by use of a hot-air dryer to form an antistatic layer. The thicknesses of the antistatic layers measured by Stylus Surface Profiler (Dektak 6 M: manufactured by ULVAC) were all approx. 25 nm.

The surface resistance value of the obtained antistatic film was measured after leaving the antistatic film in the following conditions. The evaluations results are shown in Table 2.

TABLE 6

| | Antistatic Film | Glass Substrate | | PET Film Substrate | |
|---|---|---|---|---|---|
| | | Condition (1) | Condition (2) | Condition (1) | Condition (2) |
| | | UP: State of Film DOWN: Surface Resistance ($\Omega/\square$) | | | |
| Ex. 24 | Composite Conductive Polymer Composition of Ex. 1 | ○ $3.33 \times 10^8$ | ○ $3.20 \times 10^8$ | ○ $9.45 \times 10^8$ | ○ $1.02 \times 10^9$ |
| Ex. 25 | Composite Conductive Polymer Composition of Ex. 2 | ○ $4.20 \times 10^8$ | ○ $4.49 \times 10^8$ | ○ $1.25 \times 10^9$ | ○ $1.33 \times 10^9$ |
| Comp. Ex. 16 | Conductive Polymer Composition of Comp. Ex. 5 | $>1.00 \times 10^{15}$ | $>1.00 \times 10^{15}$ | $>1.00 \times 10^{15}$ | $>1.00 \times 10^{15}$ |
| Comp. Ex. 17 | Conductive Polymer Composition of Comp. Ex. 4 Dissolved in Water | ○ $2.30 \times 10^8$ | $>1.00 \times 10^{15}$ | ○ $4.41 \times 10^8$ | $>1.00 \times 10^{15}$ |

Conditions (1): 192 hours at 23 deg. C. and 50% RH
Conditions (2): 168 hours at 40 deg. C. and 80% RH As shown above, the antistatic film of the invention exhibited sufficient antistatic property even when it is used in hot and humid conditions.

INDUSTRIAL APPLICABILITY

The composite conductive polymer composition of the invention use, as a doping agent, the polymer compound (A) comprised of three components of (a-1) a monomer having a sulfonic acid group and a polymerizable vinyl group, (a-2) a monomer having a polar group, and (a-3) a polymerizable monomer other than the components (a-1) and (a-2), and thus is stably soluble to an aromatic, ester-based, or ketone-based solvent or the like.

Furthermore, the thus-obtained composite conductive polymer composition is dissolved in an alcohol-based, glycol-based, or ether-based solvent in a transparent state to obtain a composite conductive polymer composition solution. This solution can be used to easily form a conductive membrane on a portion which requires conductivity, and thus can be used extremely advantageously in the field of electronic components and so on.

Furthermore, an electrode for a dye-sensitized solar cell and an antistatic film obtained from the composite conductive polymer composition of the invention have excellent performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A composite conductive polymer composition obtained by doping a π-conjugated polymer (β) with a polymer compound (A); wherein
the polymer compound (A) is obtained by polymerizing the following components (a-1) to (a-3), the sum of the components (a-1) to (a-3) being 100 mol %:

(a-1) a monomer having a sulfonic acid group and a polymerizable vinyl group in an amount of 20 to 60 mol %,
(a-2) a polar monomer having a hydrophilic group and a polymerizable vinyl group and not having a sulfonic acid group in an amount of 20 to 60 mol %, and
(a-3) a polymerizable monomer other than the components (a-1) and (a-2) in an amount of 20 to 60 mol %; and
the π-conjugated polymer (β) is obtained from a monomer compound selected from the formulas (I) to (III)

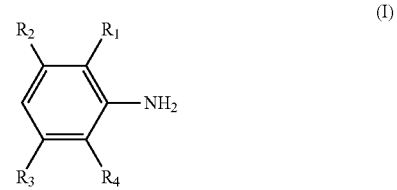

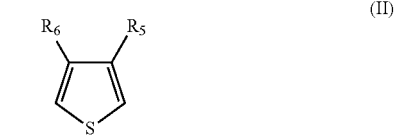

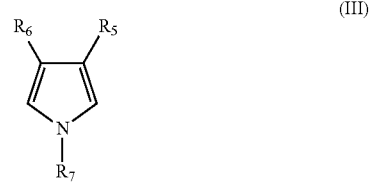

wherein, in the formulas (I) to (III),
at least one of $R_1$ to $R_4$ represent an alkoxy group having a carbon number of 1 to 10, and the other groups represent a hydrogen atom, an alkyl group having a carbon number of 1 to 10, or an alkoxy group having a carbon number of 1 to 10;
at least one of $R_5$ and $R_6$ represent an alkoxy group having a carbon number of 1 to 10, and the other group represents a hydrogen atom, an alkyl group having a carbon number of 1 to 10 or an alkoxy group having a carbon number of 1 to 10, or $R_5$ and $R_6$ jointly represent an alkylenedioxy group having a carbon number of 1 to 8;

$R_7$ represents a hydrogen atom, an alkyl group having a carbon number of 1 to 6, or an aromatic ring group, wherein the component (a-2) is a monomer producing a solution whose pH is larger than 5.5 and smaller than 8.0 (5.5<pH<8.0) when the monomer is dissolved in distillated water of pH 7.0 at the room temperature in a concentration of 0.1 mmol/l, and wherein the component (a-2) polar monomer having a hydrophilic group and a polymerizable vinyl group is selected from acrylic acid, methacrylic acid, 2-(methacryloyloxy)ethylsuccinic acid, maleic acid (maleic anhydride), 2-hydroxyethyl (meth)acrylate, 2-hydroxypropyl (meth)acrylate, 4-hydroxybutyl (meth)acrylate, 2-acetoacetoxyethyl (meth)acrylate, methoxyethyl (meth)acrylate, ethoxyethyl (meth)acrylate, butoxyethyl (meth)acrylate, ethylcarbitol (meth)acrylate, methoxytriethyleneglycol (meth)acrylate, methoxypolyethyleneglycol (meth)acrylate, and β-(meth)acryloyloxyethyl hydrogen succinate.

2. The composite conductive polymer composition of claim 1, wherein the component (a-1) monomer having a sulfonic acid group and a polymerizable vinyl group is selected from the group consisting of sodium styrenesulfonate, styrenesulfonic acid, sodium 2-sulfoethyl (meth)acrylate and 2-sulfoethyl(meth)acrylate.

3. The composite conductive polymer composition of claim 1, wherein the component (a-3) polymerizable monomer other than the components (a-1) and (a-2) is a monomer having an aromatic group or an alicyclic group and a polymerizable vinyl group.

4. The composite conductive polymer composition of claim 1, wherein the component (a-3) polymerizable monomer other than the components (a-1) and (a-2) is a monomer having an aromatic group or an alicyclic group and a polymerizable vinyl group, which is selected from the group consisting of benzyl (meth)acrylate, phenoxyethyl (meth)acrylate, neopentyl glycol acrylate benzoate ester, cyclohexyl (meth)acrylate, isobornyl (meth)acrylate, dicyclopentanyl (meth)acrylate, dicyclopentanyloxyethyl (meth)acrylate, t-butylcyclohexyl (meth)acrylate, dicyclopentenyl (meth)acrylate, dicyclopentenyloxyethyl (meth)acrylate, pentamethylpiperidinyl (meth)acrylate, tetramethylpiperidinyl (meth)acrylate, 1-adamantyl (meth)acrylate, 2-methyl-2-adamantyl (meth)acrylate, 2-ethyl-2-adamantyl (meth)acrylate, tetrahydrofurfuryl (meth)acrylate, vinylpyridine and (meth)acryloyloxy morpholine.

5. The composite conductive polymer composition of claim 1, wherein the component (a-3) polymerizable monomer other than the components (a-1) and (a-2) is an alkyl (meth)acrylate.

6. The composite conductive polymer composition of claim 1, wherein the component (a-3) polymerizable monomer other than the components (a-1) and (a-2) is an alkyl (meth)acrylate selected from the group consisting of methyl (meth)acrylate, ethyl (meth)acrylate, n-propyl (meth)acrylate, i-propyl (meth)acrylate, n-butyl (meth)acrylate, i-butyl (meth)acrylate, i-propyl (meth)acrylate, t-butyl (meth)acrylate, n-pentyl (meth)acrylate, i-pentyl (meth)acrylate, 2-ethylhexyl (meth)acrylate, isooctyl (meth)acrylate, lauryl (meth)acrylate and stearyl (meth)acrylate.

7. A composite conductive polymer composition solution obtained by dissolving the composite conductive polymer composition of claim 1 in an aromatic solvent, ester-based solvents or ketone-based solvent in an amount of 0.1 to 10 mass %.

8. The composite conductive polymer composition solution of claim 7, further comprising metal, oxidation metal, conductive polymer composition, carbon powder or dispersoid.

9. A counter electrode for a dye-sensitized solar cell obtained from the composite conductive polymer composition of claim 1.

10. An antistatic film obtained from the composite conductive polymer composition of claim 1.

* * * * *